(12) United States Patent
Ringenberger et al.

(10) Patent No.: US 7,713,335 B2
(45) Date of Patent: May 11, 2010

(54) AIR SEPARATOR

(75) Inventors: Rhett Dakota Ringenberger, Lafayette, IN (US); Jason Frederick Jackson, Grandview, IN (US); Catalin Mugurel Tiru, Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 748 days.

(21) Appl. No.: 11/589,060

(22) Filed: Oct. 30, 2006

(65) Prior Publication Data
US 2008/0098893 A1 May 1, 2008

(51) Int. Cl.
*B01D 19/00* (2006.01)

(52) U.S. Cl. .............................. 95/261; 96/209; 96/211; 96/212; 95/262; 123/516

(58) Field of Classification Search ................... 95/261, 95/262; 96/209, 211, 212, 220, 204; 123/516
See application file for complete search history.

(56) References Cited

U.S. PATENT DOCUMENTS

| | | | |
|---|---|---|---|
| 2,297,238 A * | 9/1942 | Lichte et al. ................. | 123/516 |
| 2,698,672 A | 1/1955 | Burnside et al. | |
| 2,762,451 A * | 9/1956 | McNeil ....................... | 96/212 |
| 2,878,889 A * | 3/1959 | Gilbert ......................... | 96/174 |
| 4,345,919 A * | 8/1982 | Wilkinson et al. ............ | 95/261 |
| 4,367,078 A | 1/1983 | Hendrix | |
| 4,614,527 A | 9/1986 | Reimann | |
| 4,707,165 A * | 11/1987 | Tauber et al. ................. | 96/174 |
| 4,806,135 A * | 2/1989 | Siposs ........................... | 96/212 |
| 4,927,056 A | 5/1990 | Glover | |
| 5,363,988 A | 11/1994 | Saxton et al. | |
| 5,579,740 A | 12/1996 | Cotton et al. | |
| 5,787,729 A | 8/1998 | Wijaya | |
| 5,827,486 A | 10/1998 | Crossdale | |
| 5,884,809 A | 3/1999 | Wood et al. | |

(Continued)

FOREIGN PATENT DOCUMENTS

EP 0140402 5/1985

(Continued)

OTHER PUBLICATIONS

PCT International Search Report; PCT/US2007/020877; Filing Date: Sep. 27, 2007; Caterpillar Inc.

*Primary Examiner*—Duane Smith
*Assistant Examiner*—Douglas J Theisen
(74) *Attorney, Agent, or Firm*—Finnegan, Henderson, Farabow, Garrett & Dunner (57) ABSTRACT

A device for separating gas from liquid includes a housing having an inlet for receiving a flow of liquid and gas. The inlet is positioned such that the flow of liquid and gas enters the housing in a direction substantially tangential to a circumference of an inner surface of the housing. The housing also includes a first outlet for discharging an at least partially gaseous flow from the housing and a second outlet for discharging an at least partially deaerated flow of liquid from the housing. The device also includes a gas separating element disposed inside the housing downstream from the inlet and upstream from the second outlet. The gas separating element forms at least one opening to permit liquid to pass and form the at least partially deaerated flow and to permit the at least partially gaseous flow to separate from the at least partially deaerated flow.

23 Claims, 4 Drawing Sheets

U.S. PATENT DOCUMENTS

| | | |
|---|---|---|
| 5,954,102 A | 9/1999 | Sato et al. |
| 6,179,163 B1 | 1/2001 | Bohr et al. |
| 6,290,760 B1 | 9/2001 | Taivalkoski et al. |
| 6,398,973 B1 | 6/2002 | Saunders et al. |
| 6,485,854 B1 | 11/2002 | Grover et al. |
| 6,576,029 B2 | 6/2003 | West |
| 6,622,709 B2 * | 9/2003 | Miller et al. ................. 123/516 |
| 6,752,860 B1 | 6/2004 | Hoydal et al. |
| 6,753,503 B2 | 6/2004 | Bankstahl et al. |
| 6,773,492 B1 | 8/2004 | West |
| 6,959,836 B2 | 11/2005 | Collasius et al. |
| 6,976,713 B2 | 12/2005 | Kish et al. |
| 7,001,448 B1 | 2/2006 | West |
| 7,013,878 B1 | 3/2006 | Cotton et al. |
| 7,044,999 B2 | 5/2006 | Bankstahl et al. |
| 2001/0005986 A1 | 7/2001 | Matsubara et al. |
| 2003/0154860 A1 * | 8/2003 | Milia ........................... 95/261 |

FOREIGN PATENT DOCUMENTS

| | | |
|---|---|---|
| GB | 04325 | 0/1905 |
| JP | 2-294510 | 12/1990 |
| JP | 6-10334 | 1/1994 |
| NL | 6606353 | 11/1966 |

* cited by examiner

AIR SEPARATOR

TECHNICAL FIELD

The present disclosure relates generally to a separator for separating a gas from a liquid, and more particularly, to an air separator.

BACKGROUND

Fuel injection systems typically employ multiple fuel injectors to inject fuel into combustion chambers of an engine. This fuel is supplied to the fuel injectors via a common manifold secured to the engine and individual supply lines connected between the common manifold and the injectors.

The presence of air mixed into the fuel can undermine the performance of the fuel injection system, such as a pump and line system. For example, pressurizing the mixture of air and fuel may cause damage to the pump. Furthermore, mixing of the air into the fuel supply can be undesirable in higher pressure systems because it can cause actual combustion characteristics to deviate from expected combustion characteristics, potentially undermining the control of the combustion process. Deaeration of the fuel is desirable so that the pump performs in a predictable manner.

One method of separating air from fuel is described in U.S. Pat. No. 5,884,809 ("the '809 patent") to Wood et al. The '809 patent describes a system for dispensing fuel into a fuel tank in a vehicle. The system includes an air separator having an air separation chamber with a conical lower section. A fuel stream is introduced into an upper section of the air separation chamber such that the fuel stream flows in a cyclonic flow pattern. Air is forced toward the center of the air separation chamber and downwardly into a bleed tube. The fuel, from which the air has been removed, is discharged from an opening at the base of the conical lower section and then flows to a dispenser head for dispensing the fuel into the vehicle.

Although the system of the '809 patent may provide a fuel dispensing system that is capable of separating air from fuel, providing a central opening at the base of the air separation chamber for the fuel may allow more air to remain in the fuel that exits from the air separation chamber, thereby providing poor efficiency and inadequate air removal. Furthermore, the bleed tube of the '809 patent allows both the air and the fuel to exit downwardly from the air separation chamber via adjacent openings. However, this may allow the air and fuel to mix again, thereby also reducing efficiency of the air separator and providing unacceptably high air content in the fuel. In addition, the air separator of the '809 patent is directed towards removing air prior to being dispensed into a fuel tank of a vehicle and does not address the problems of removing air in a fuel injection system.

The disclosed system is directed to overcoming one or more of the problems set forth above.

SUMMARY OF THE INVENTION

In one aspect, the present disclosure is directed to a device for separating gas from liquid. The device includes a housing having an inlet for receiving a flow of liquid and gas. The inlet is positioned such that the flow of liquid and gas enters the housing in a direction substantially tangential to a circumference of an inner surface of the housing. The housing also includes a first outlet for discharging an at least partially gaseous flow from an interior of the housing and a second outlet for discharging an at least partially deaerated flow of liquid from the interior of the housing. The device also includes a gas separating element disposed inside the housing downstream from the inlet and upstream from the second outlet. The gas separating element forms at least one opening to permit liquid to pass and form the at least partially deaerated flow of liquid and to permit the at least partially gaseous flow to separate from the at least partially deaerated flow of liquid.

In another aspect, the present disclosure is directed to a method for separating gas from liquid. The method includes supplying a flow of liquid and gas to a chamber and directing the flow of liquid and gas towards a baffle disposed inside the chamber. The baffle includes a plurality of openings and has a substantially concave shape. The method also includes discharging an at least partially gaseous flow from the chamber and discharging an at least partially deaerated flow of liquid from the chamber downstream from the baffle.

In yet another aspect, the present disclosure is directed to a device for separating gas from liquid. The device includes a housing having an inlet for receiving a flow of liquid and gas, a first outlet for discharging an at least partially gaseous flow from an interior of the housing, and a second outlet for discharging an at least partially deaerated flow of liquid from the interior of the housing. The device also includes a flow channel in the housing downstream of the inlet. The flow channel has a cross-sectional area that decreases as the flow of liquid and gas passes through the flow channel. The device also includes a gas separating element disposed inside the housing downstream from the flow channel and upstream from the second outlet. The gas separating element includes a plurality of openings.

DETAILED DESCRIPTION

Reference will now be made in detail to exemplary embodiments, which are illustrated in the accompanying drawings. Wherever possible, the same reference numbers will be used throughout the drawings to refer to the same or like parts.

Figure 1:
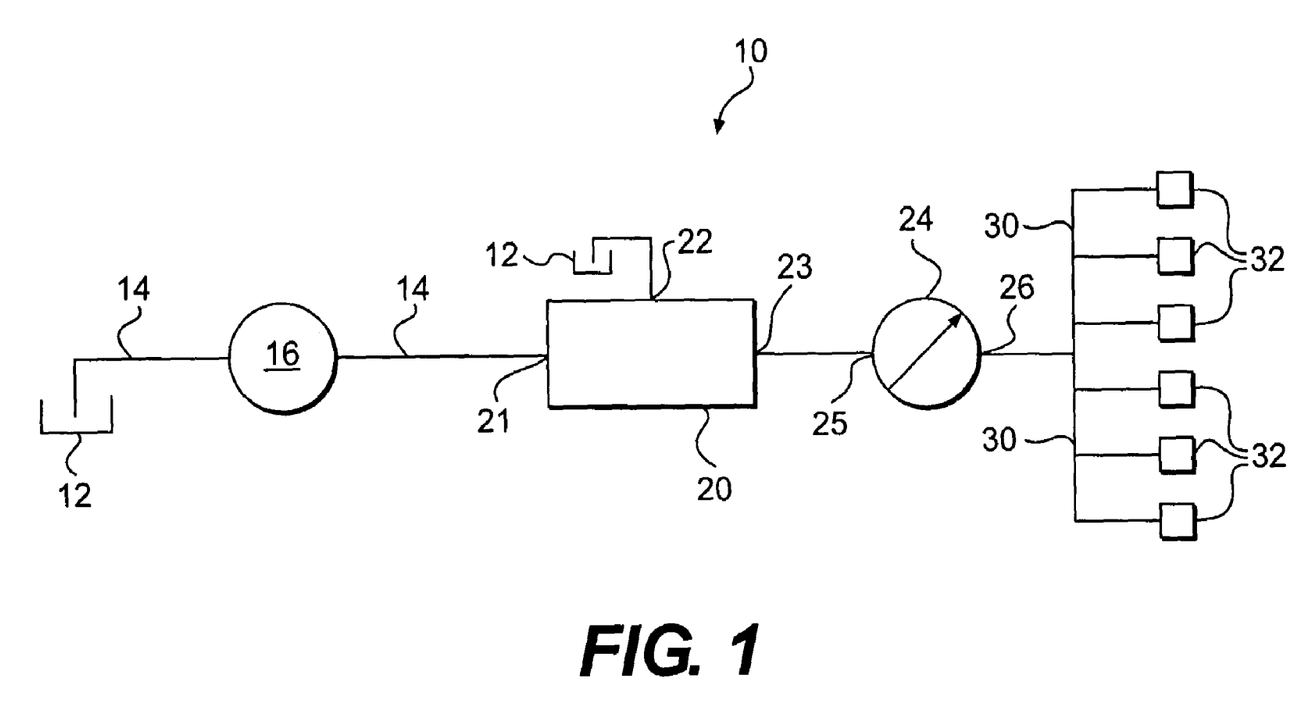
FIG. 1 is a schematic and diagrammatic illustration of a fuel supply system in accordance with an exemplary embodiment of the present invention.

An exemplary embodiment of a fuel supply system 10 is illustrated in FIG. 1. Fuel supply system 10 may be provided as part of a machine that performs some type of operation associated with an industry such as mining, construction, farming, transportation, power generation, or any other industry known in the art. For example, the machine may be a mobile machine such as an excavator, a dump truck, a backhoe, a bus, a marine vessel, or any other mobile machine known in the art.

Fuel supply system 10 may include a transfer pump (not shown) adapted to draw a flow of fuel, which may be, for example, gasoline, diesel fuel, or any type of fuel commonly used in the operation of an internal combustion engine, from a tank 12 through a fuel line 14. The transfer pump may be any type of pump commonly used in a fuel supply system, such as, for example, a gear driven transfer pump.

One or more filters 16 may be disposed in fuel line 14. The flow of fuel is directed from tank 12 through filter 16. Filter 16 may be adapted to remove dirt, debris, or any other undesirable elements from the flow of fuel. Filter 16 may be any type of filter commonly used in a fuel supply system, such as, for example, two-micron filters. One or more additional filters may be disposed in series and/or in parallel with filter 16 in fuel supply system 10.

Fuel supply system 10 includes an air separator 20. Air separator 20, which is described in detail below, includes an inlet 21 that is adapted to receive the flow of fuel leaving filter 16 via fuel line 14. The flow of fuel directed to inlet 21 may be a mixture of liquid fuel, air, and/or other gaseous substances, such as fuel vapor. Air separator 20 also includes a first outlet 22 that is adapted to output at least partially gaseous flow and a second outlet 23 that is adapted to output a flow of at least partially deaerated fuel. The at least partially gaseous flow output from first outlet 22 may include air, fuel vapor, and/or other gaseous substances, and may be supplied back to tank 12. The at least partially gaseous flow may also include some liquid fuel.

Fuel supply system 10 may also include a fuel pump 24, such as a high pressure pump. Fuel pump 24 includes an inlet 25 that is adapted to receive the flow of at least partially deaerated fuel leaving air separator 20. Fuel pump 24 is adapted to increase the pressure of the flow of at least partially deaerated fuel to a predetermined pressure, which may also be referred to as an "injection pressure," and supply the at least partially deaerated pressurized fuel via an outlet 26. One skilled in the art will recognize that fuel pump 24 may be any type of pump commonly used in a fuel injection or supply system. Fuel pump 24 may be, for example, a fixed capacity pump, a variable capacity pump, or a variable displacement pump.

Fuel supply system 10 may also include a fuel rail 30. Fuel rail 30 is connected to outlet 26 of fuel pump 24 to receive the flow of the at least partially deaerated pressurized fuel exiting fuel pump 24. Fuel rail 30 is adapted to receive and hold a quantity of fuel at the predetermined, or injection, pressure.

A series of fuel injectors 32 may be placed in fluid connection with fuel rail 30. Each fuel injector 32 may be associated with a combustion chamber (not shown) of an internal combustion engine (not shown). Each fuel injector 32 may be adapted to inject a certain quantity of fuel supplied from fuel rail 30 into the respective combustion chamber at a certain point in the operating cycle of the engine. Fuel injectors 32 may be controlled mechanically, electronically, hydraulically, or any combination thereof.

Figure 2:
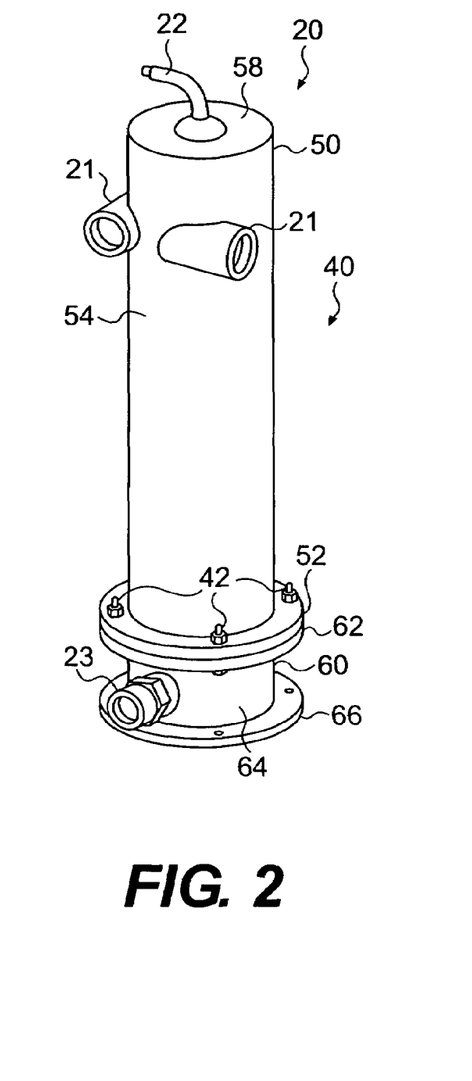
FIG. 2 is a perspective view of an exemplary disclosed air separator of the fuel supply system of FIG. 1.
Figure 3:
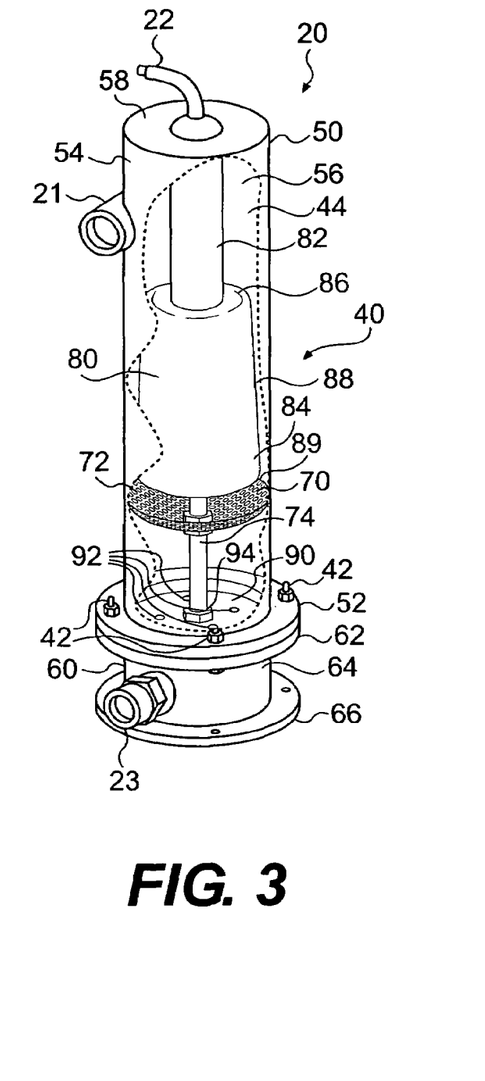
FIG. 3 is a partially cutaway perspective view of the air separator of FIG. 2.

Referring to FIGS. 2 and 3, an exemplary air separator 20 includes a housing 40. Housing 40 may be divided into an upper portion 50 and a lower portion 60 that are connected together using respective flanges 52, 62 and/or other structures configured to assist in removably coupling housing upper and lower portions 50, 60. Flanges 52, 62 may be connected together using one or more connecting devices 42, such as, for example, band clamps, bolts, screws, ties, and/or other structures or devices capable of removably attaching and/or coupling two devices together. Alternatively, housing 40 may be formed as a single component instead of separate upper and lower portions 50, 60 and flanges 52, 62 and connecting devices 42 may be omitted.

Two inlets 21 may be disposed in a side wall 54 of housing upper portion 50. The mixture of fuel, air, and/or other gaseous substances may be supplied via one inlet 21 at a time or both inlets 21 simultaneously. Alternatively, another number of inlets 21 may be provided, e.g., a single inlet or three or more inlets. Each inlet 21 is positioned such that the mixture of fuel, air, and/or other gaseous substances enters housing 40 in a direction substantially tangential to a circumference of an inner surface 56 of housing upper portion 50.

First outlet 22 may be disposed in an upper wall 58 of housing upper portion 50. Alternatively, multiple first outlets 22 may be provided. As another alternative, first outlet 22 may be positioned in another wall, e.g., side wall 54, of housing upper portion 50.

Second outlet 23 may be disposed in a side wall 64 of housing lower portion 60. Alternatively, multiple second outlets 23 may be provided. As another alternative, second outlet 23 may be positioned in another wall, e.g., bottom wall 66, of housing lower portion 60.

Housing upper and lower portions 50, 60 define a gas separation chamber 44 inside housing 40. Gas separation chamber 44 may have a generally cylindrical shape, as shown in FIG. 3, that is bounded by side wall 54 and upper wall 58 of housing upper portion 50 and side wall 64 and bottom wall 66 of housing lower portion 60.

One or more gas separating elements, such as a baffle 70 and a plate 90, are disposed in gas separation chamber 44. Baffle 70 is a gas separating element, such as a plate, wall, screen, or mesh. As shown in FIG. 3, baffle 70 is a plate that includes a plurality of openings 72 permitting an at least partially deaerated flow of fuel to pass and preventing an at least partially gaseous flow from passing. The size and number of openings 72 are configured to be large enough to allow liquid to pass through baffle 70 and small enough to slow down and prevent air and/or other gases from passing through baffle 70. The size and number of openings 72 may be determined experimentally for optimal gas separation performance.

Baffle 70 may be disposed in housing upper portion 50. An entire peripheral edge of baffle 70 may be in substantial contact with inner surface 56 of housing upper portion 50. Baffle 70 may be formed of plastic, metal, or other substantially rigid material that is not adversely affected by exposure to fuel. Baffle 70 may have a substantially concave shape that opens, for example, towards inlets 21. Alternatively, the substantially concave shape of baffle 70 may open towards second outlet 23. Baffle 70 may be hemispherical, as shown in FIG. 3, or conical. Alternatively, baffle 70 may be flat and/or include a bend, such as a 90° bend (not shown).

A support rod 74 positions baffle 70 in gas separation chamber 44 and connects baffle 70 to plate 90, as shown in FIG. 3. Alternatively or in addition, support rod 74 may connect baffle 70 to upper wall 58 of housing upper portion 50. As another alternative, a connecting mechanism (not shown) may attach the peripheral edge of baffle 70 to inner surface 56 of housing upper portion 50.

Plate 90 is disposed between baffle 70 and second outlet 23 in gas separation chamber 44. Plate 90 is a gas separating element that may be disposed between and attached to flanges 52, 62 of housing upper and lower portions 50, 60. Plate 90 includes a plurality of holes 92 that further allow air to separate from the flow of fuel by preventing air and/or other gaseous substances from passing. Thus, the size and number of holes 92 are configured to be large enough to allow liquid to pass through plate 90 and small enough to slow down and prevent air and/or other gases from passing through plate 90. The size and number of holes 92 may be determined experimentally for optimal air separation performance. In the exemplary embodiment shown in FIG. 3, plate 90 includes four holes 92.

A first flow member 80 and a second flow member 82 may be disposed in gas separation chamber 44 in housing upper portion 50 between baffle 70 and upper wall 58. First and second flow members 80, 82 are fluidly connected to provide respective passageways through which the at least partially gaseous flow including air and/or other gaseous fluids may flow. The at least partially gaseous flow is caught by and enters first flow member 80 via an opening at a first end 84. Second flow member 82 connects to second end 86 of first flow member 80, receives the at least partially gaseous flow from first flow member 80, and directs the at least partially gaseous flow towards first outlet 22.

A flow channel 88 is formed between inner surface 56 of housing upper portion 50 and the respective outer surfaces of first and second flow members 80, 82. The mixture of fuel, air, and/or other gaseous substances may flow through flow channel 88 towards baffle 70. As shown in FIG. 3, second flow member 82 may be tubular. First flow member 80 may have a tapered outer profile that gradually gets wider, i.e., increases in diameter, from a second end 86 to first end 84. Flow channel 88 is wider between second end 86 of first flow member 80 and inner surface 56 of housing upper portion 50 than between first end 84 of first flow member 80 and inner surface 56 of housing upper portion 50. Thus, flow channel 88 becomes narrower along the direction of flow from inlets 21 to baffle 70. First flow member 80 and baffle 70 may be separated by a gap 89.

Figure 4:
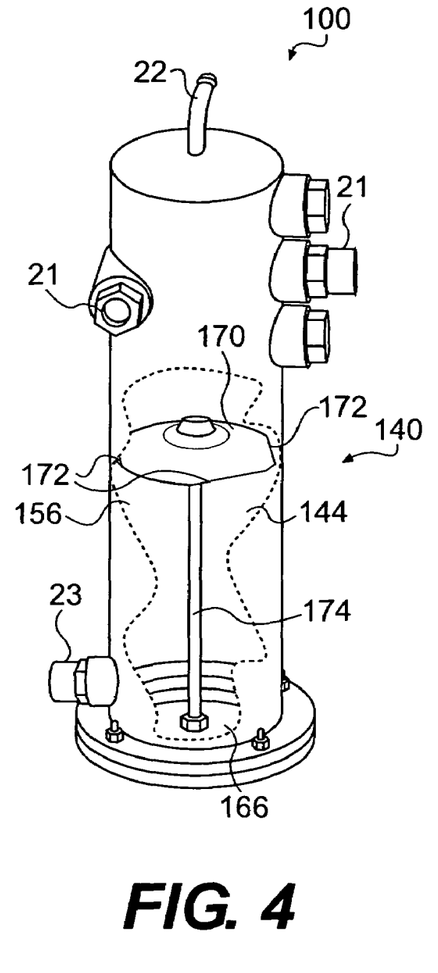
FIG. 4 is a partially cutaway perspective view of another exemplary disclosed air separator of the fuel supply system of FIG. 1.

FIG. 4 shows another exemplary air separator 100 that includes a housing 140 defining a gas separation chamber 144. A gas separating element, such as a baffle 170, is disposed in gas separation chamber 144. As shown in FIG. 4, baffle 170 is a plate that includes a plurality of openings 172 that create narrow spaces between baffle 170 and an inner surface 156 of housing 140 along a peripheral edge of baffle 170. The size and number of openings 172 are configured to be large enough to allow liquid to pass through baffle 170 and small enough to slow down and prevent air and/or other gases from passing through baffle 170. The size and number of openings 172 may be determined experimentally for optimal gas separation performance. Therefore, baffle 170 permits an at least partially deaerated flow of fuel to pass and prevents an at least partially gaseous flow from passing. Except for the narrow spaces formed by openings 172 in baffle 170, an entire peripheral edge of baffle 170 may be in substantial contact with housing inner surface 156. Furthermore, baffle 170 may have a substantially concave shape that, for example, opens towards second outlet 23. A support rod 174 positions baffle 170 in gas separation chamber 144 and connects baffle 170 to a bottom wall 166 of housing 140.

Figure 5:
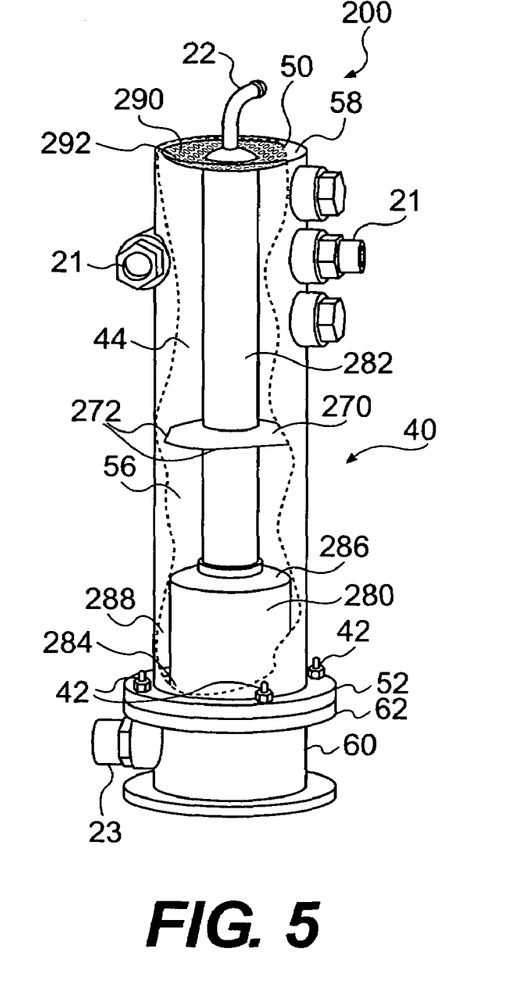
FIG. 5 is a partially cutaway perspective view of yet another exemplary disclosed air separator of the fuel supply system of FIG. 1.

FIG. 5 shows another exemplary air separator 200 that includes housing 40 defining gas separation chamber 44. A gas separating element, such as a baffle 270, is disposed in housing upper portion 50. Baffle 270 is attached to and extends radially from a second flow member 282 to housing upper portion 50. Baffle 270 is a gas separating element, such as a plate as shown in FIG. 5, that includes a plurality of openings 272 that create narrow spaces between baffle 270 and inner surface 56 of housing upper portion 50 along a peripheral edge of baffle 270. The size and number of openings 272 are configured to be large enough to allow liquid to pass through baffle 270 and small enough to slow down and prevent air and/or other gases from passing through baffle 270. The size and number of openings 272 may be determined experimentally for optimal gas separation performance. Therefore, baffle 270 permits an at least partially deaerated flow of fuel to pass and prevents an at least partially gaseous flow from passing. Except for the narrow spaces formed by openings 272 in baffle 270, an entire peripheral edge of baffle 270 may be in substantial contact with inner surface 56 of housing upper portion 50. Furthermore, baffle 270 may have a substantially concave shape that, for example, opens towards second outlet 23.

A first flow member 280 and second flow member 282 are also disposed in gas separation chamber 44 in housing upper portion 50. First and second flow members 280, 282 may be tubular, as shown in FIG. 5, and are fluidly connected to provide respective passageways through which the at least partially gaseous flow including air and/or other gaseous fluids may flow. The at least partially gaseous flow is caught by and enters first flow member 280 via an opening at a first end 284. First end 284 of first flow member 280 may include a flange (not shown) inserted between and attached to flanges 52, 62 of housing upper and lower portions 50, 60 via connecting device 42. Second flow member 282 connects to second end 286 of first flow member 280, receives the at least partially gaseous flow from first flow member 280, and directs the at least partially gaseous flow towards first outlet 22.

A flow channel 288 is formed between inner surface 56 of housing upper portion 50 and the respective outer surfaces of first and second flow members 280, 282. The mixture of fuel, air, and/or other gaseous substances may flow through flow channel 288 towards baffle 270. As shown in FIG. 5, first flow member 280 may have an outer surface with a diameter that is larger than the diameter of the outer surface of second flow member 282. As a result, flow channel 288 is wider between second flow member 282 and inner surface 56 of housing upper portion 50 than between first flow member 280 and inner surface 56 of housing upper portion 50. Thus, flow channel 288 becomes narrower along the direction of flow from inlets 21 to baffle 270. Furthermore, first flow member 280 and second outlet 23 may be separated by a gap (not shown).

Optionally, another gas separating element, such as a plate 290, may be disposed in gas separation chamber 44 in housing 40 adjacent to upper wall 58 of housing upper portion 50. Plate 290 may be attached by its peripheral edge to inner surface 56 of housing upper portion 50. Plate 290 is a gas separating element that includes a plurality of holes 292 that allow further separation of air and/or other gases from the fuel.

Figure 6:
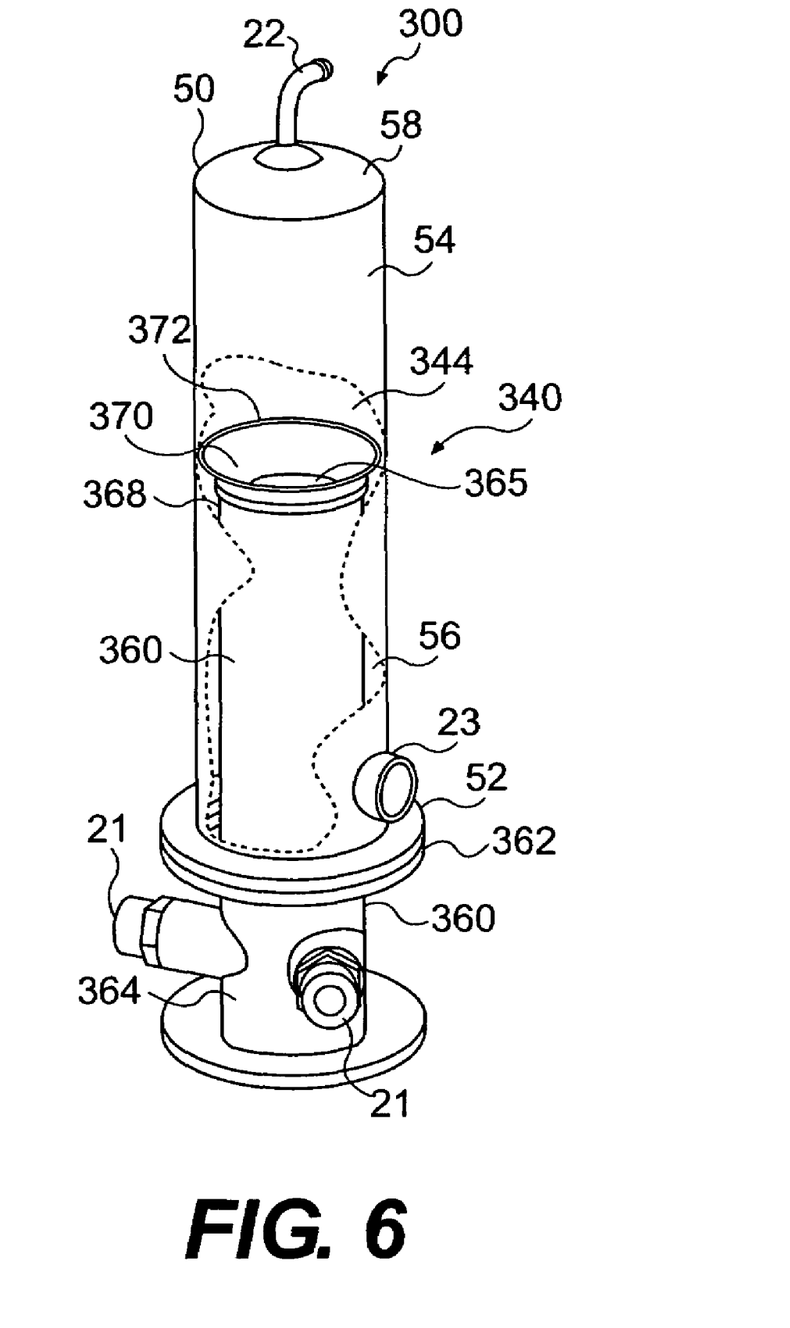
FIG. 6 is a partially cutaway perspective view of a further exemplary disclosed air separator of the fuel supply system of FIG. 1.

FIG. 6 shows another exemplary air separator 300 that includes a housing 340 defining a gas separation chamber 344. Housing 340 includes upper portion 50 and a lower portion 360 connected together using respective flanges 52, 362. As shown in FIG. 6, flange 362 of housing lower portion 360 may extend radially from a middle portion of a side wall 364 of housing lower portion 360. Flanges 52, 362 may be connected together using a connecting device (not shown), such as bolts.

Inlets 21 for supplying the mixture of fuel, air, and/or other gases may be disposed in side wall 364 of housing lower portion 360. The mixture of fuel, air, and/or other gases enters housing lower portion 360 via inlets 21 in a direction substantially tangential to a circumference of inner surface 365 of housing lower portion 360. First outlet 22 is disposed in upper wall 58 of housing upper portion 50, and second outlet 23 is disposed in side wall 54 of housing upper portion 50. As shown in FIG. 6, second outlet 23 may be disposed near a bottom end of side wall 54 such that first and second outlets 22, 23 are spaced apart.

Gas separation chamber 344 is formed within housing upper and lower portions 50, 360. A gas separating element, such as a baffle 370, is disposed in gas separation chamber 344. As shown in FIG. 6, baffle 370 is a plate extending radially (i.e., towards side wall 54 of housing upper portion 50) and upwardly (i.e., towards upper wall 58 of housing upper portion 50) in a substantially conical shape from a top end 368 of housing lower portion 360. Baffle 370 has a peripheral edge 372 with a diameter that is smaller than a diameter of inner surface 56 of housing upper portion 50. As a result, a narrow gap is created between baffle 370 and inner surface 56 of housing 340 along peripheral edge 372 of baffle 370. The size of the gap is configured to be large enough to allow liquid to pass through and small enough to slow down and prevent air and/or other gases from passing through. The size of the gap may be determined experimentally for optimal gas separation performance. Therefore, the gap permits an at least partially deaerated flow of fuel to pass and prevents an at least partially gaseous flow from passing.

INDUSTRIAL APPLICABILITY

The disclosed air separator may be applicable to any machine that benefits from separating gas, such as air, from a liquid, such as for a fuel supply system or fuel injection system. The disclosed air separator may remove gas from fuel before the fuel is supplied to a high pressure fuel pump, thereby decreasing the risk of damage to the fuel pump and other components of the fuel supply system. The operation of the air separator will now be explained.

When fuel supply system 10 is operating, the transfer pump may draw fuel from tank 12 and transfer a flow of fuel, which may include a mixture of fuel, air, and/or other gases, through filter 16 to air separator 20, 100, 200, 300. Air separator 20, 100, 200, 300 may output a flow of at least partially gaseous flow via first outlet 22 and a flow of at least partially deaerated fuel via second outlet 23. The flow of at least partially deaerated fuel may be supplied to fuel pump 24. Fuel pump 24 applies work to the at least partially deaerated fuel to further increase the flow to an injection pressure. The pressurized fuel is then directed into fuel rail 30 and supplied to fuel injectors 32. Fuel injectors 32 inject the pressurized fuel into the combustion chambers of the engine.

The mixture of fuel, air, and/or other gases is supplied to air separator 20, 100, 200, 300 via inlets 21. Inlets 21 may be positioned to allow the incoming mixture to be received substantially tangential to a circumference of inner surface 56, 156 of housing upper portion 50, 150. As a result, the mixture may swirl as it moves through housing 40, 140, 340 from inlets 21 towards second outlet 23. That is, the mixture may flow circumferentially in a spiral in housing 40, 140, 340 as it travels along the axial direction from inlets 21 to second outlet 23.

Referring to FIG. 3, in exemplary air separator 20, the swirling mixture from inlets 21 swirls around the outer surface of second flow member 82, and is directed toward flow channel 88 between the outer surface of first flow member 80 and inner surface 56 of housing upper portion 50. The cross-section of flow channel 88 gradually decreases in the direction of flow, thereby providing a gradual increase in flow momentum as the swirling mixture flows from second end 86 to first end 84 of first flow member 80. The change in flow momentum allows air and/or other gases to separate from the fuel.

After exiting flow channel 88, the swirling mixture enters gap 89 between first flow member 80 and baffle 70. In gap 89, the swirling mixture loses momentum and the speed of the mixture drops to a low speed, e.g., near zero speed. This drop in momentum allows air and/or other gases to separate further from the fuel. The flow of fuel may flow through gap 89 toward baffle 70.

Upon contacting baffle 70, the swirling mixture loses momentum and slows down. A boundary layer forms within the swirling mixture along the surface of baffle 70. The boundary layer is a thin layer of the swirling mixture along the surface of baffle 70 that has a lower speed. The concave shape of baffle 70 allows for an increased amount of the swirling mixture to form the boundary layer than, for example, a flat baffle 70. Furthermore, the concave shape of baffle 70 may be more efficient for slowing down the swirling mixture as the mixture flows in a spiraling, tangential path. Air separators 100, 200, 300 shown in FIGS. 4-6 also provide baffles 170, 270, 370 having concave or conical shapes.

Air and/or other gases may be prevented from flowing through openings 72 in baffle 70 and may form the at least partially gaseous flow. Some liquid fuel may also be included in the at least partially gaseous flow. The at least partially gaseous flow may enter through an opening in first end 84 of first flow member 80 where it is directed through the respective passageways in first flow member 80 and second flow member 82 towards first outlet 22. The at least partially gaseous flow is then supplied to tank 12 (FIG. 1) where it may be redirected through fuel line 14 back to inlets 21 of air separator 20.

Fuel may pass through openings 72 in baffle 70 and form an at least partially deaerated flow of fuel that may flow toward plate 90. Plate 90 may remove more air and/or other gaseous substances from the at least partially deaerated flow of fuel. Air and/or other gaseous substances may be substantially prevented from flowing through openings 92 in plate 90. Therefore, the flow of at least partially deaerated fuel pass through openings 92 in plate 90 and may be further deaerated. The flow of at least partially deaerated fuel may flow toward second outlet 23 and supplied to fuel pump 24 (FIG. 1) as described above.

Referring to FIG. 4, the swirling mixture from inlets 21 may be directed toward concave baffle 170 in air separator 100. Upon contacting baffle 170, the swirling mixture may form the boundary layer, lose momentum, and slow down, as described above in relation to baffle 70 shown in FIG. 3. Air and/or other gaseous substances may be prevented from flowing through openings 172 in baffle 170 and may form an at least partially gaseous flow upstream from the baffle 170. The at least partially gaseous flow may flow toward first outlet 22 after being separated by baffle 170 from a flow of at least partially deaerated fuel and is then supplied back to tank 12 (FIG. 1). The fuel that passes through openings 172 in baffle 170 forms the flow of at least partially deaerated fuel. The flow of at least partially deaerated fuel is directed toward second outlet 23 and supplied to fuel pump 24 (FIG. 1) as described above.

Referring to FIG. 5, the swirling mixture from inlets 21 swirls around the outer surface of second flow member 282 and is directed toward concave baffle 270 in air separator 200. Upon contacting baffle 270, the swirling mixture may form the boundary layer, lose momentum, and slow down, as described above in relation to baffle 70 shown in FIG. 3. Air and/or other gaseous substances may be prevented from flowing through openings 272 in baffle 270. The fuel that passes through openings 272 in baffle 270 forms a flow of at least partially deaerated fuel that may continue to flow in a swirling pattern around the outer surface of second flow member 282. The swirling fuel is then directed toward flow channel 288 between the outer surface of first flow member 280 and inner surface 56 of housing upper portion 50. Flow channel 288 has a relatively narrow cross-section, which provides an increase in flow momentum as the swirling fuel flows through flow channel 288 from second end 286 to first end 284 of first flow member 280. The change in flow momentum allows air and/or other gaseous substances to separate from the fuel.

After exiting flow channel 288, the flow of at least partially deaerated fuel flows toward the gap between first flow member 280 and second outlet 23. In the gap, the flow of at least partially deaerated fuel loses momentum and the speed of the mixture drops to a low speed, e.g., near zero speed. This drop in momentum allows further air and/or other gaseous substances to separate from the fuel. The flow of at least partially deaerated fuel may flow through the gap toward second outlet 23 and may then be supplied to fuel pump 24 (FIG. 1) as described above. An at least partially gaseous flow that is separated from the flow of at least partially deaerated fuel in the gap may enter through an opening in first end 284 of first flow member 280 where it is directed through the respective passageways in first and second flow members 280, 282 towards first outlet 22 and is then supplied to tank 12 (FIG. 1).

Referring to FIG. 6, the swirling mixture from inlets 21 may be directed through housing lower portion 360 toward housing upper portion 50 and baffle 370 in air separator 300. Upon contacting baffle 370, the swirling mixture may form the boundary layer, lose momentum, and slow down, as described above in relation to baffle 70 shown in FIG. 3. The swirling mixture may flow through the gap formed between peripheral edge 372 of baffle 370 and inner surface 56 of housing upper portion 50. Since the gap is relatively narrow, the swirling mixture gains momentum and speeds up. Due to the change in momentum, air and/or other gaseous substances may be substantially prevented from flowing through the gap, thereby forming an at least partially gaseous flow. After being separated using baffle 370 at the gap, the at least partially gaseous flow flows to first outlet 22 and is then supplied to tank 12 (FIG. 1). Fuel that passes through the gap between baffle 370 and housing upper portion 50 forms a flow of at least partially deaerated fuel. The flow of at least partially deaerated fuel is directed through a passageway formed between an inner surface of housing upper portion 50 and an outer surface of a flow member disposed in housing upper portion 50, such as the portion of housing lower portion 360 disposed in housing upper portion 50. The flow of at least partially deaerated fuel is then directed toward second outlet 23 and is then supplied to fuel pump 24 as described above.

Air separator 20, 100, 200, 300 allows air and/or other gaseous substances to be removed efficiently from the fuel using multiple gas separating elements, such as baffles 70, 170, 270, 370 and plates 90, 290, and by varying the momentum of the fuel. As a result, the air and/or other gaseous substances may be removed from the fuel prior to being supplied to the fuel pump 24 and injectors 32 in order to prevent damage to those components, for example, when the fuel is pressurized.

Gas separating elements, such as baffles 70, 170, 270, 370 and plates 90, 290, provide narrow openings 72, 92, 172, 272, 292 or gaps that allow gaseous substances to separate from the fuel. The size and number of the openings 72, 92, 172, 272, 292 may be configured to provide optimal gas removal. In addition, the baffles 70, 170, 270, 370 and plates 90, 290 may allow the fluid to create a boundary layer, thereby decreasing fluid momentum and allowing more gaseous substances to separate from the fuel. As a result, greater efficiency and increased removal of gaseous substances are provided.

Air separators 20, 200, 300 include flow channels 88, 288 having changes in cross-sectional area. The changes in cross-sectional area allow changes in fluid momentum, which allow more gaseous substances to separate from the fuel. As a result, greater efficiency and increased removal of gaseous substances are provided.

First outlet 22 and second outlet 23 are spaced apart in housing 40, 140, 340. For example, in exemplary air separators 20, 200 shown in FIGS. 2, 3, and 5, first outlet 22 may be provided in upper wall 58 of housing upper portion 50 and second outlet 23 may be provided in side wall 64 of housing lower portion 60. In exemplary air separators 100, 300 shown in FIGS. 4 and 6, first outlet may be provided in upper wall 58 of housing upper portion 50 and second outlet 23 may be provided towards a bottom end of housing upper portion 50. As a result, the at least partially gaseous flow and the flow of at least partially deaerated fuel exit from gas separation chamber 44, 144, 344 via separate, spaced-apart openings, thereby enabling the at least partially gaseous flow and the at least partially deaerated flow to stay separate and allowing increased efficiency and increased removal of gaseous substances.

As one skilled in the art will recognize, a fuel supply system 10 in accordance with the present disclosure may be used with any type of internal combustion engine. For example, fuel supply system 10 may be used with a gasoline or diesel engine. In addition, the internal combustion engine may be used in any common application, such as, for example, to power a vehicle or to drive a generator.

Alternatively, disclosed air separator 20, 100, 200, 300 may be used with other types of fluid supply systems. For example, air separator 20, 100, 200, 300 may remove air and/or other gaseous substances from other types of liquids, such as oil, water, etc.

It will be apparent to those skilled in the art that various modifications and variations can be made to the air separator. Other embodiments will be apparent to those skilled in the art from consideration of the specification and practice of the disclosed air separator. It is intended that the specification and examples be considered as exemplary only, with a true scope being indicated by the following claims and their equivalents.

What is claimed is:

1. A device for separating gas from liquid, comprising:
   a housing including:
      an inlet for receiving a flow of liquid and gas, the inlet being positioned such that the flow of liquid and gas enters the housing in a direction substantially tangential to a circumference of an inner surface of the housing,
      a first outlet for discharging an at least partially gaseous flow from an interior of the housing, and
      a second outlet for discharging an at least partially deaerated flow of liquid from the interior of the housing;
   at least one flow member disposed inside the housing, the at least one flow member defining a first flow channel and a second flow channel in the housing downstream of the inlet, the first flow channel having a cross-section that decreases in the downstream direction through the first flow channel, the second flow channel being inside the at least one flow member; and
   a gas separating element disposed inside the housing downstream from the inlet and upstream from the second outlet, the gas separating element forming at least one opening to permit liquid to pass and form the at least partially deaerated flow of liquid and to permit the at least partially gaseous flow to separate from the at least partially deaerated flow of liquid.

2. The device of claim 1, wherein the gas separating element is formed having a plurality of openings.

3. The device of claim 1, wherein the at least one opening is formed between a peripheral edge of the gas separating element and the inner surface of the housing.

4. The device of claim 1, wherein the at least one flow member is tapered and the decrease in the cross-section of the first flow channel is provided by the taper of the at least one flow member.

5. The device of claim 1, wherein the at least one flow member is configured to receive the at least partially gaseous flow from the gas separating element and to direct the at least partially gaseous flow to the first outlet.

6. The device of claim 1, wherein the gas separating element has a substantially concave shape.

7. The device of claim 1, wherein the first outlet and the inlet are disposed in an upper portion of the housing and the second outlet is disposed in a lower portion of the housing.

8. The device of claim 1, further including at least two gas separating elements disposed inside the housing downstream from the inlet and upstream from the second outlet, the gas separating elements each including a plurality of openings.

9. The device of claim 1, wherein the liquid is fuel, and the inlet is configured to receive a flow of fuel and gas.

10. The device of claim 9, wherein the inlet is configured to be fluidly connected to a fuel tank and a fuel filter disposed downstream of the fuel tank to receive the flow of fuel and gas.

11. The device of claim 10, wherein the first outlet is configured to be fluidly connected to supply the at least partially gaseous flow to the fuel tank.

12. The device of claim 9, wherein the second outlet is configured to be fluidly connected to a fuel pump configured to pressurize the flow of at least partially deaerated fuel, and the pressurized flow of at least partially deaerated fuel is configured to be directed to a plurality of fuel injectors.

13. The device of claim 1, wherein at least a portion of the first flow channel is between an outer surface of the at least one flow member and the housing.

14. The device of claim 1, wherein the second flow channel is configured to receive the at least partially gaseous flow.

15. The device of claim 1, wherein the decrease in the cross-section of the first flow channel is provided by an increase in a cross-section of the at least one flow member.

16. A method for separating gas from liquid, comprising:
supplying a flow of liquid and gas to a chamber;
directing the flow of liquid and gas towards an opening formed between a baffle disposed inside the chamber and an inner wall of the chamber, the opening being configured to permit liquid to pass to form an at least partially deaerated flow of liquid and to permit an at least partially gaseous flow to separate from the at least partially deaerated flow of liquid;
discharging the at least partially gaseous flow from the chamber;
directing the at least partially deaerated flow of liquid downstream from the opening and through a flow channel between an outer surface of at least one flow member and the inner wall of the chamber; and
discharging the at least partially deaerated flow of liquid from the chamber downstream from an entrance of the flow channel.

17. The method of claim 16, wherein the supplying of the flow of liquid and gas includes directing the flow of liquid and gas in a direction substantially tangential to a circumference of an inner surface of the chamber.

18. The method of claim 16, wherein directing the flow of liquid and gas towards the opening includes directing the flow of liquid and gas through a flow channel inside the at least one flow member.

19. A device for separating gas from liquid, comprising:
a housing including:
an inlet for receiving a flow of liquid and gas,
a first outlet for discharging an at least partially gaseous flow from an interior of the housing, and
a second outlet for discharging an at least partially deaerated flow of liquid from the interior of the housing;
a flow channel in the housing downstream of the inlet, the flow channel having a cross-sectional area that decreases as the flow of liquid and gas passes through the flow channel; and
a gas separating element disposed inside the housing downstream from the flow channel and upstream from the second outlet, the gas separating element including a plurality of openings.

20. The device of claim 19, further including at least one flow member disposed inside the housing such that the flow channel is formed between an outer surface of the at least one flow member and the housing.

21. The device of claim 20, wherein the at least one flow member is tapered and the decrease in the cross-sectional area of the flow channel is provided by the taper of the at least one flow member.

22. The device of claim 20, wherein the at least one flow member is configured to receive the at least partially gaseous flow from the gas separating element and to direct the at least partially gaseous flow to the first outlet.

23. The device of claim 20, wherein:
the at least one flow member includes a first flow member and a second flow member;
a first flow channel portion formed between the first flow member and the housing is downstream from a second flow channel portion formed between the second flow member and the housing; and
the first flow member includes a larger outer diameter than the second flow member.

* * * * *